C. F. SCHULZE.
METHOD OF LAYING OUT PATTERNS.
APPLICATION FILED FEB. 18, 1909.

945,814.

Patented Jan. 11, 1910.
3 SHEETS—SHEET 1.

Witnesses

Inventor
Charles F. Schulze,
By Joshua R. H. Potts.
Attorney

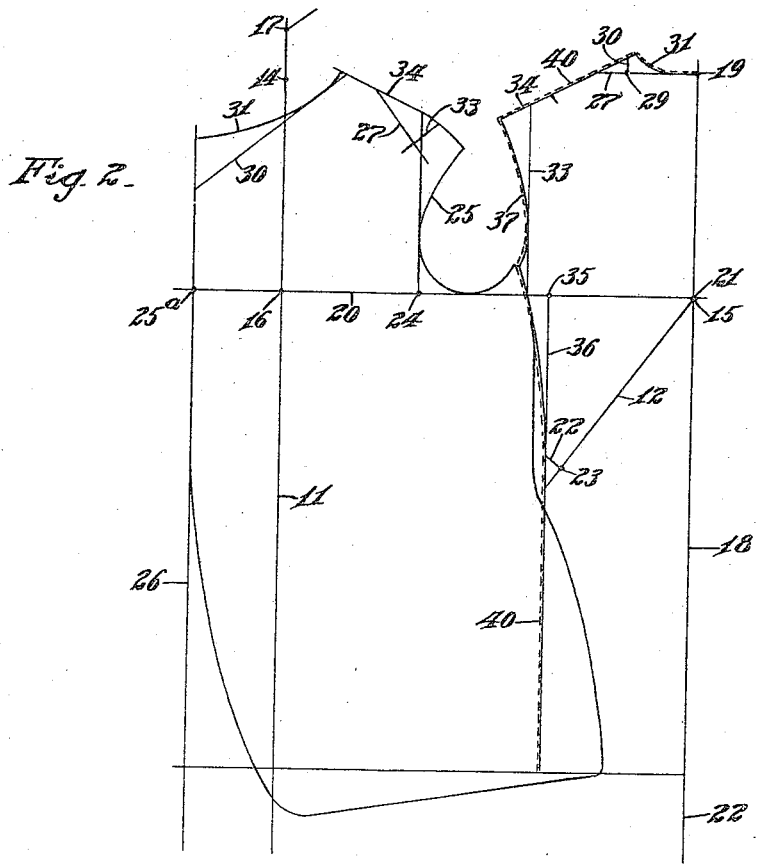
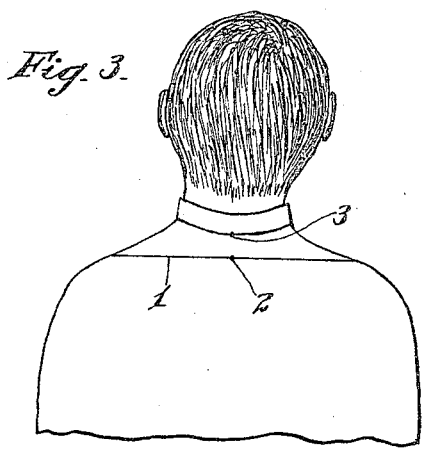
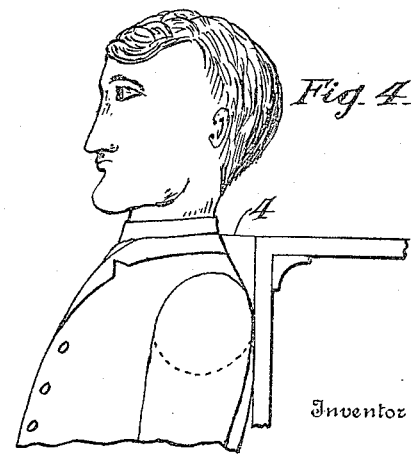

C. F. SCHULZE.
METHOD OF LAYING OUT PATTERNS.
APPLICATION FILED FEB. 18, 1909.

945,814.

Patented Jan. 11, 1910.
3 SHEETS—SHEET 3.

Witnesses
Theo. Riemann
J. F. J. Mulhall

Inventor
Charles F. Schulze,
By Joshua R. H. Potts.
Attorney

UNITED STATES PATENT OFFICE.

CHARLES F. SCHULZE, OF POTTSVILLE, PENNSYLVANIA.

METHOD OF LAYING OUT PATTERNS.

945,814.     Specification of Letters Patent.     Patented Jan. 11, 1910.

Application filed February 18, 1909. Serial No. 478,586.

*To all whom it may concern:*

Be it known that I, CHARLES F. SCHULZE, a citizen of the United States, residing at Pottsville, in the county of Schuylkill and State of Pennsylvania, have invented certain new and useful Improvements in Methods of Laying Out Patterns, of which the following is a specification.

My invention relates to an improved method of measuring the human form and utilizing such measurements in making patterns, the object of the invention being to provide an improved method, which will accurately measure the body of the customer and insure a perfect fit.

A further object is to provide an improved method, which accurately measures the height of the shoulders, and the incline of the back or neck above the shoulders, as I term it "erectness," and these measurements together with the breast measure constitute the base upon which the calculations of the pattern are made.

A further object is to provide an improved method for utilizing the measurements above stated upon a pattern, whereby the goods cut from the pattern will accurately fit the body of the customer.

Heretofore a great many methods of measuring and cutting patterns have been devised, which are faulty, in that they rely too much upon the body measurements, which are taken while the customer assumes an unusual position, and are therefore not accurate, and the resultant clothes are an imperfect fit. Further they depend upon the location of a shoulder point as a basis of measurement, and owing to the impossibility of obtaining positively accurate body measurements, this point cannot be accurately located but in a small percentage of cases. Prior methods also require a large number of measurements, which add to the liability of mistake, and result in loss of time and money to the tailor, and annoyance to the customer.

To overcome the defects of prior methods, and to provide a simple method which will permit a customer to be quickly measured, enabling the pattern to be quickly drawn without relying upon a shoulder point and insure a perfect fit, my invention was devised and will now be described in detail.

The invention consists in certain novel steps in the method as will be more fully hereinafter described and pointed out in the claim.

Figure 1:
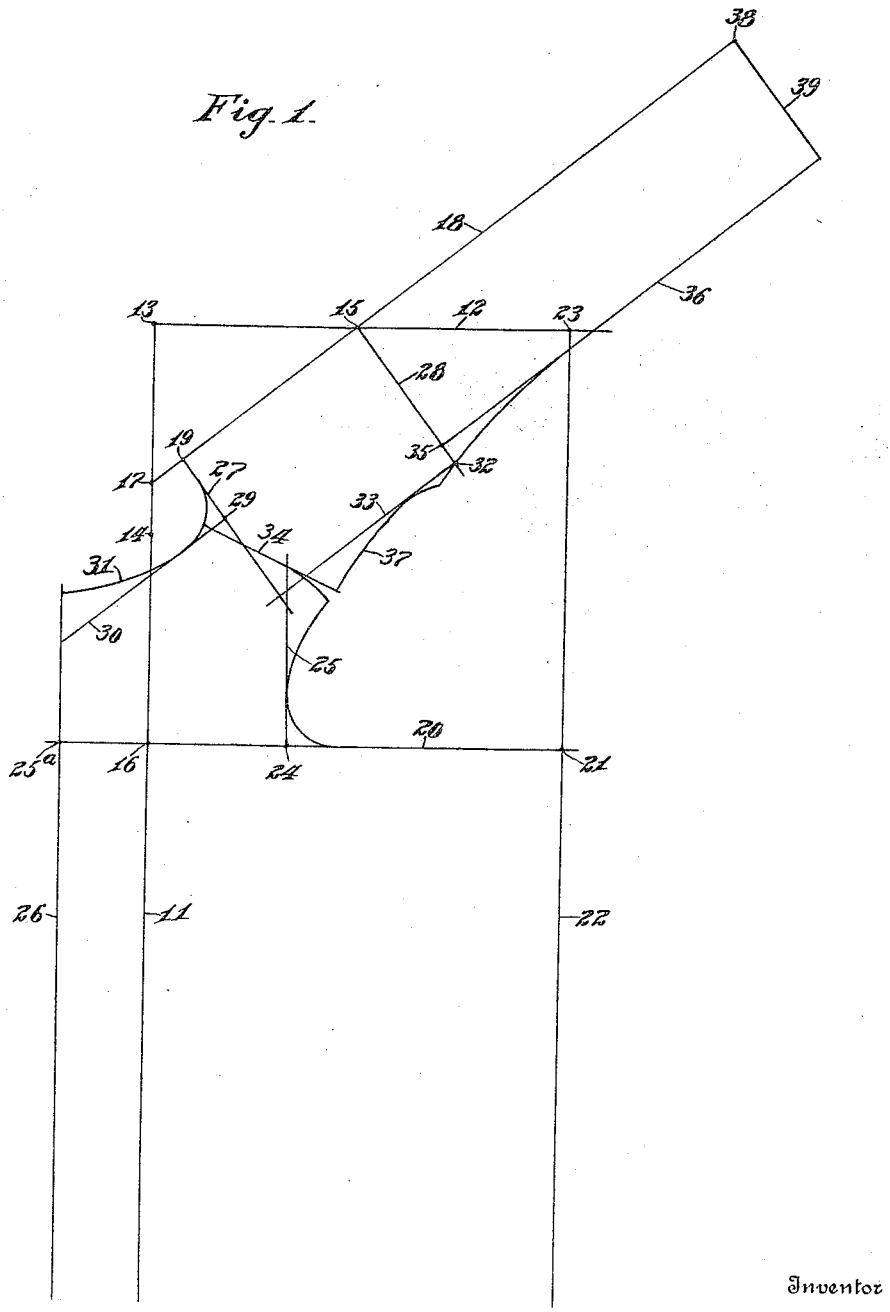
Figure 5:
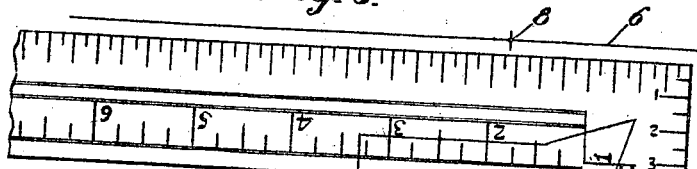
Figure 6:
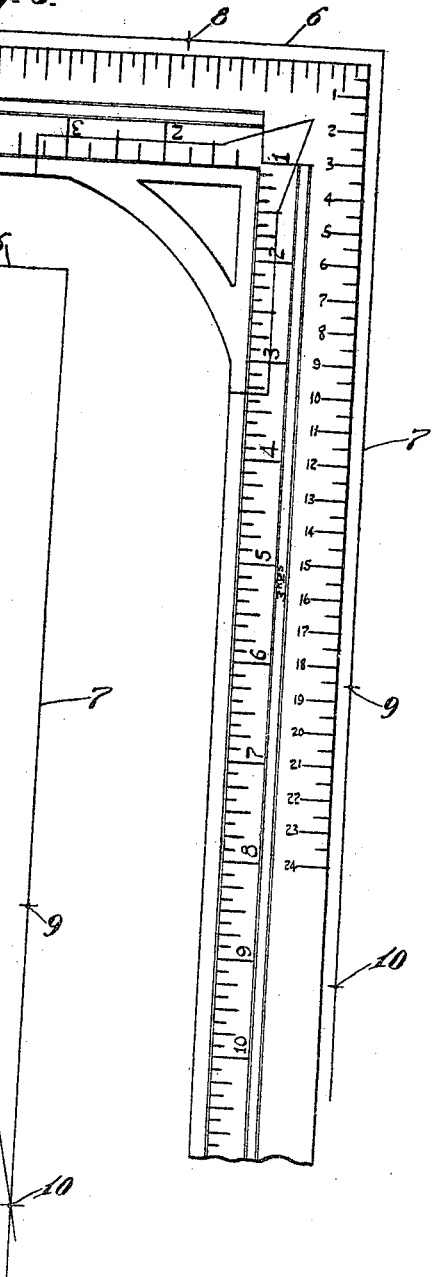

In the accompanying drawings, Figure 1, is a view illustrating the manner of making the pattern. Fig. 2, is a similar view showing the pattern further advanced. Figs. 3 and 4 are views illustrating the manner of taking measurements. Figs. 5 and 6, are views illustrating the manner of finding the depth of scye, vertical line, and body line.

In carrying out my method, it is necessary to take but three measurements, namely, shoulder measurement (which is a measurement of the distance from the center of a line connecting the centers of the shoulders to the base of the back of the neck); the measure of erectness (which is the distance from a perpendicular line touching the center of the back between the shoulders to the neck); and the breast measure. Fig. 3, illustrates the manner of finding the shoulder measurement. A line such as shown at 1, is taken from the central point on the shoulders across the back of the subject, and the distance from this line at the center of the back as shown at 2, to the center of the back of the neck at the base as shown at 3, is measured, which distance in a normal form will be two inches, in a more stooping form it will be longer, and in a more erect form it will be shorter. This measurement may be taken with an instrument, but it is so short that it may be readily taken with the naked eye. The next measurement to be taken is that measurement which I term "erectness" but which in fact measures the stoop of the shoulders. This measurement is taken from a straight edge touching the back between the shoulders, and in a horizontal line from said straight edge to the center of the back of the neck as shown at 4, which in a normal form will be two inches. This measurement may also be taken accurately with the naked eye, as it is so short, and tailors soon accustom themselves to quickly detect the differences in such measurements in normal and abnormal figures. We will, therefore, assume that we are measuring a normal figure, and that both of these measurements are two inches. The next measurement to be taken is the breast measure, which is taken with an ordinary measure in the ordinary way, and we will assume that this measurement is thirty-eight inches. We therefore, have the following measurements, shoulder two inches, erectness two inches, and breast thirty-eight inches. Before starting to mark the pattern, it is necessary to first find, from the measurements above taken, the depth of scye, body line, and the depth of scye, vertical line, and I would have it understood that where I refer to vertical line, I mean by that term, a vertical or straight line which touches the points without following the outline of the body, or in other words, is a vertical measurement, which crosses horizontal lines drawn from the points indicated. To find these measurements, I employ an ordinary tailor's square, which is marked off in thirds of inches as indicated on the square in Fig. 5. With this instrument, I draw the two lines 6 and 7 at right angles to each other, and place on the line 6, a distance from the point of the angle, equal to the erectness or degree of stoop, which I have found to be two inches, a point which I have marked 8. The breast measure, which I have found to be thirty-eight inches, it is necessary to divide, as patterns are cut in halves, and we therefore, have for half of the pattern nineteen inches. This nineteen we measure on the line 7 from the point of the angle, a distance equal to nineteen thirds of inches on the square, and find the point 9, and from this point 9, we measure a distance of three inches, which point we designate at 10. A line is then drawn from the point 8 to the point 10. From the point of angle to the point 10 will give us the vertical line, depth of scye, which we find to be nine and three-eighths inches, and the line from 8 to 10 will give us the body measurement, depth of scye, which we will find to be nine and five-eighths inches. It is obvious that with more stoop (that is, a greater distance from the angle to the point 8) the line 8—10 will be longer giving a deeper scye and for persons who are more erect a less horizontal distance and scye of less depth. This manner of utilizing one-half of the breast measure in thirds of inches on the square, and adding three inches to said measurements to find the depth of scye, vertical line, and body line, has been found to be absolutely accurate, and dispenses with the necessity of body measurements to find these distances. We now have the following measurements, breast thirty-eight inches, shoulder two inches, erectness two inches, depth of scye, vertical line, nine and three-eighths inches, and depth of scye, body line, nine and five-eighths inches.

To mark off the pattern as shown in Fig. 1, lines 11 and 12 are drawn at right angles to each other from a point 13, and are of indefinite length. On the line 11, a distance is measured from the point 13 equal to the depth of scye, vertical line, which we have found to be nine and three-eighths inches, and locate a point 14. This measurement is also made upon the line 12 from the point 13, and the point 15 is found. This measurement is also taken from the point 14 on the line 11, and the point 16 is found. A measurement is then taken from the point 14 on the line 11 toward the point 13 a distance equal to the shoulder measurement (two inches) and the point 17 located. A straight line 18 is then drawn through points 17 and 15, this line 18 constituting the back line of the pattern. On this line 18 from the point 15 toward the point 17, a distance is measured equal to the depth of scye, body line, which we have found to be nine and five-eighths inches, and the point 19 is located. A line 20 is drawn at right angles from the point 16, and a distance on this line equal to one-half of the breast measure, which we have found to be nineteen inches, is measured, and the point 21 found, and the line 22 is drawn at right angles across the point 21 touching the line 12, and the point 23 is located. A distance is measured on line 20 from the point 21, equal to two-thirds of the breast measure on the square, and the point 24 is found, and a line 25 is drawn at right angles to the line 20, from this point 24 toward the line 12. The line 20 is extended past the point 16, a distance which we will assume to be four inches, and the point 25ª is found, and the line 26 is drawn at right angles to the line 20. This distance between the points 16 and 25ª will vary in accordance with the style of lapel to be used on the coat. Lines 27 and 28 respectively, are drawn at right angles to the line 18 from the points 19 and 15, and a distance equal to one-sixth of the breast measure on the square is measured on the line 27 from the point 19, and the point 29 is found. The line 30 is then drawn at right angles to the line 27 and intersects the line 26. The cutter, then between these lines 27, 30 and 26, draws the line 31, which is the neck line, and can be readily made by any cutter of experience. On the line 28, the distance is measured from the point 15 equal to one-third of one-half of the breast measure, and one and one-half inches added to find the point 32, and the line 33 is drawn at right angles to the line 28 from the point 32, and intersects the line 27. The line 34 indicates the line of shoulder seam, and will be placed by the cutter in accordance with the style prevailing, and can be readily placed upon the pattern from the lines and points above referred to. On the line 28 from the point 32 toward the point 15, a distance of one inch is measured to find the point 35, and a line 36 is drawn at right angles to the line 28, and parallel with the line 18. The cutter then marks the finishing line 37 of the back, which he can readily do from the lines and points above given, and this of course will vary in accordance with the style desired. The length of the pattern on the lines 18 and 36 will of course be determined in accordance with the length of the coat desired, and in accordance with said length the point 38 is found, and line 39 drawn at right angles from the line 18 to the line 36. The cutter then cuts out that portion of the pattern between the lines 18, 36 and 37, and the seam line 34 and the bottom line 39, and places this cut out portion of the pattern on the body of the pattern as shown in Fig. 2, the line 18 registering with line 22, and the point 15 registering with the point 21. The outline of this cut out portion is then marked on the body of the pattern as indicated by the line 40.

The remaining lines of the pattern as indicated in Figs. 1 and 2, are purely lines which are governed by the styles and the tastes of the customer, and cannot be accurately measured. They would therefore, be formed on the pattern by more or less guess work, such as ordinarily done in cutting, and need not therefore be set forth more in detail. It will thus be observed that in carrying out my method, it is necessary to have but three essential measurements in order to obtain a perfect fit. These measurements are, as I term them, shoulder measurement, erectness, and breast measure, and with these measurements, I am enabled to carry out my method and produce excellent results at the same time dispensing with the usual shoulder point which has heretofore been used as a basis of measurement and fitting.

Having thus described my invention what I claim as new and desire to secure by Letters Patent is:

A method of measuring the human form and utilizing such measurements in making a pattern, consisting in measuring the height of shoulders by drawing a horizontal line across the back connecting the centers of each shoulder, then measuring the distance from the center of said horizontal line to the center of base of neck at the back; then measuring the distance from the center of the base of the neck at the back to a central vertical line tangent to the body line at the back to find degree of stooping, then measuring the body around the breast, then utilizing these measurements substantially as set forth, to find the depth of scye body line, and depth of scye in a straight line which would touch horizontal lines drawn from the center of the base of neck at the back, and from the lowest point of scye, then drawing lines and finding the points upon a pattern in substantially the manner set forth to accurately mark on the pattern the outlines of the shoulders of the garment to be made, whereby the location of the shoulder point as a basis of measurement is dispensed with.

In testimony whereof I have signed my name to this specification in the presence of two subscribing witnesses.

CHARLES F. SCHULZE.

Witnesses:
S. W. FOSTER,
J. A. L. MULHALL.